(12) United States Patent
Sugahara

(10) Patent No.: US 8,561,930 B2
(45) Date of Patent: Oct. 22, 2013

(54) SPINNING REEL FISHING LINE GUIDE MECHANISM

(75) Inventor: Ken'ichi Sugahara, Osaka (JP)

(73) Assignee: Shimano Inc., Osaka (JP)

( * ) Notice: Subject to any disclaimer, the term of this patent is extended or adjusted under 35 U.S.C. 154(b) by 302 days.

(21) Appl. No.: 13/017,894

(22) Filed: Jan. 31, 2011

(65) Prior Publication Data
US 2011/0210197 A1    Sep. 1, 2011

(30) Foreign Application Priority Data

Feb. 26, 2010 (JP) ................................. 2010-041879

(51) Int. Cl.
*A01K 89/01* (2006.01)
(52) U.S. Cl.
USPC ........................................ 242/231; 242/230
(58) Field of Classification Search
USPC ........................................ 242/230, 231, 232
See application file for complete search history.

(56) References Cited

U.S. PATENT DOCUMENTS

| | | | |
|---|---|---|---|
| 5,149,006 A * | 9/1992 | Hitomi ............................ | 242/231 |
| 6,220,537 B1 * | 4/2001 | Amano et al. ................... | 242/231 |
| 6,905,086 B2 * | 6/2005 | Sugawara et al. ............... | 242/231 |
| 7,137,585 B2 * | 11/2006 | Ochiai ............................ | 242/231 |
| 7,967,232 B2 * | 6/2011 | Hiraoka et al. ................. | 242/231 |
| 2004/0041043 A1 * | 3/2004 | Sugawara et al. .............. | 242/231 |
| 2004/0206839 A1 * | 10/2004 | Sugawara ...................... | 242/231 |
| 2004/0211852 A1 * | 10/2004 | Sugawara ...................... | 242/231 |
| 2006/0027691 A1 * | 2/2006 | Ochiai ............................ | 242/231 |
| 2009/0152389 A1 * | 6/2009 | Ochiai et al. ................... | 242/231 |

FOREIGN PATENT DOCUMENTS

EP    0 812 536 A2    12/1997
JP    3934512 B2    3/2007

OTHER PUBLICATIONS

European Search Report of corresponding EP Application No. 11 15 4535.6 dated Jun. 27, 2011.

* cited by examiner

*Primary Examiner* — Emmanuel M Marcelo
(74) *Attorney, Agent, or Firm* — Global IP Counselors, LLP

(57) ABSTRACT

A spinning reel fishing line guide mechanism for guiding a fishing line onto a spool is provided. The spinning reel fishing line guide mechanism includes first and second bail support members pivotably attached to first and second rotor arms respectively, a fixation shaft fixed to the first bail support member, a fixation shaft cover, a line roller, and a bail guiding the fishing line to the line roller through the fixation shaft cover. The fixation shaft cover includes a cover body disposed onto an axial end of the fixation shaft wherein the cover body is separate from the first bail support member, and an engagement groove on a lateral portion of the cover body. The lateral portion extends to the fixation shaft. The bail has a rod portion having a rod shape, and a plate portion attached to the rod portion.

8 Claims, 7 Drawing Sheets

SPINNING REEL FISHING LINE GUIDE MECHANISM

CROSS-REFERENCE TO RELATED APPLICATIONS

This application claims priority to Japanese Patent Application No. 2010-041879 filed on Feb. 26, 2010. The entire disclosure of Japanese Patent Application No. 2010-041879 is hereby incorporated herein by reference.

BACKGROUND OF THE INVENTION

1. Field of the Invention

The present invention relates to a fishing line guide mechanism, and particularly to a spinning reel fishing line guide mechanism attached to the tip of a first rotor arm and the tip of a second rotor arm for pivoting between a fishing line guide position and a fishing line release position in order to guide a fishing line onto a spool.

2. Background Art

The spinning reels normally include a fishing line guide mechanism configured to guide a fishing line onto a spool. The fishing line guide mechanism is attached to the tip of a first rotor arm and the tip of a second rotor arm. The fishing line guide mechanism is configured to rotate together with a rotor. The fishing line guide mechanism is allowed to pivot between a fishing line release position and a fishing line guide position. The fishing line guide mechanism thus configured to include a pair of a first bail support member and a second bail support member, a fixation shaft, a fixation shaft cover, a bail and a line roller. The fixation shaft is fixed to the tip of the first bail support member with one of the axial ends thereof. The fixation shaft cover is fixed to the other of the axial ends of the fixation shaft. The bail is attached to the fixation shaft cover with one of the ends thereof. The line roller is supported by the fixation shaft. One of the ends of the bail is inserted and fixed into the fixation shaft cover, whereas the other of the ends of the bail is attached to the tip of the second bail support member.

In the spinning reel including the aforementioned fishing line guide mechanism, a handle is rotated while the bail is pivoted rotated to the fishing line guide position for winding the fishing line onto the spool. The fishing line is led to and makes contact with the outer peripheral surface of the line roller through the fixation shaft cover while being led by the bail. While led by the line roller, the fishing line changes its direction and is wound around the outer periphery of the spool.

For example, Publication of Japan Patent No. 3934512 discloses a fishing line guide mechanism of the aforementioned type. In the fishing line guide mechanism, a bail includes a rod portion and a plate portion. The rod portion which has a rod shape is fixed to a second bail support member with one end thereof. The plate portion which has a plate shape is smoothly continued to the rod portion with one end thereof. Further, the other end of the plate portion is inserted into a groove portion formed in a fixation shaft cover. The plate portion is thereby smoothly continued to the fishing line guide side portion of the fixation shaft cover with the other end thereof. The fixation shaft cover includes the groove portion that the end thereof is opened as a slit. The bail plate portion is inserted into the groove portion for smoothly continuing to the fishing line guide side portion of the fixation shaft cover and an opposite portion thereto. No step is herein produced between the fixation shaft cover and the bail due to the structure that the bail is smoothly continued to the fishing line guide side of the fixation shaft cover. Therefore, such the fishing line guide mechanism has fewer chances to get the fishing line get stuck in with a portion between the fixation shaft cover and the bail.

In the well-known fishing line guide mechanism, the bail is smoothly continued to the fishing line guide side portion of the fixation shaft cover. This prevents the fishing line from being easily get stuck in with the portion between the fixation shaft cover and the bail. However, the plate portion of the bail is inserted into the groove portion opened on the end of the fixation shaft cover. In other words, the plate portion is inserted into the groove portion and is disposed on the end of the fixation shaft cover. The fishing line may be get stuck in with the area.

SUMMARY OF THE INVENTION

In view of the above, the present invention addresses a need to produce a spinning reel fishing line guide mechanism for preventing tangling of a fishing line.

A spinning reel fishing line guide mechanism for guiding a fishing line onto a spool is provided. The spinning reel fishing line guide mechanism is attached to a tip of a first rotor arm and a tip of a second rotor arm for rotating.

The spinning reel fishing line guide mechanism includes a first bail support member being pivotably attached to the tip of the first rotor arm, a second bail support member being pivotably attached to the tip of the second rotor arm, a fixation shaft fixed to the first bail support member at a first axial end of the fixation shaft, a fixation shaft cover, a line roller rotatably supported by the fixation shaft wherein the line roller includes a guide portion on a peripheral surface thereof for guiding the fishing line, and a bail configured to lead the fishing line to the line roller through the fixation shaft cover.

The fixation shaft cover includes a cover body disposed onto a second axial end of the fixation shaft wherein the cover body is separate from the first bail support member. The second axial end is opposite to the first axial end. The fixation shaft cover also includes a first engagement groove on a lateral portion of the cover body, wherein the lateral portion extends to the fixation shaft. The bail includes a rod portion having a rod shape, and a plate portion attached to the rod portion at a first end of the plate portion. The plate portion is attached to the fixation shaft cover at a second end opposite to the first end. The plate portion includes a first engagement section being engaged with the first engagement groove.

BRIEF EXPLANATION OF THE DRAWINGS

Referring now to the attached drawings which form a part of this original disclosure.

DETAILED DESCRIPTION OF THE EMBODIMENTS

Figure 1:
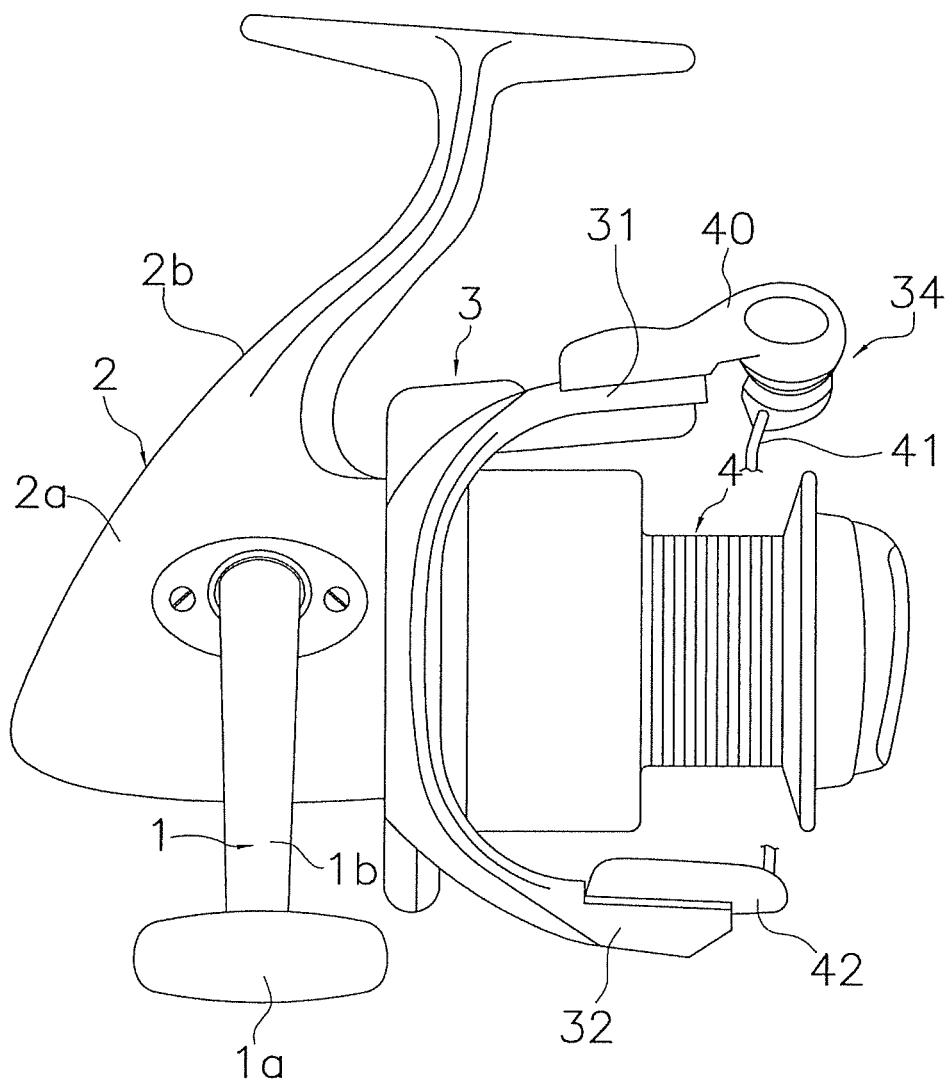
FIG. 1 is a right side view of a spinning reel adopting an exemplary embodiment of the present invention.
Figure 2:
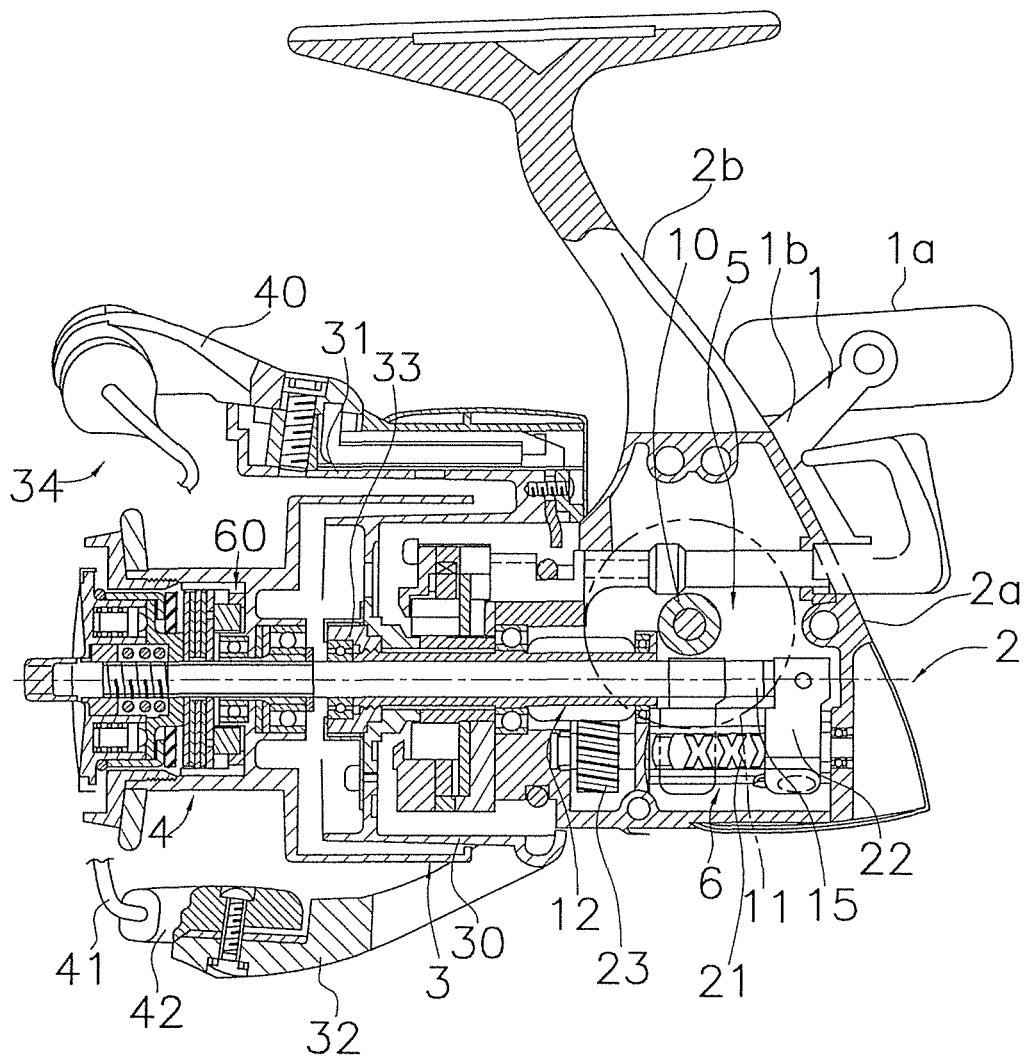
FIG. 2 is a left side cross-sectional view of the spinning reel.

As illustrated in FIGS. 1 and 2, a spinning reel adopting an exemplary embodiment of the present invention mainly includes a handle 1, a reel unit 2, a rotor 3 and a spool 4. The reel unit 2 supports the handle 1 while allowing it to rotate. The rotor 3 is rotatably supported at the front of the reel unit 2. The spool 4 is configured to wind a fishing line around the outer peripheral surface thereof. The spool 4 is disposed at the front of the rotor 3 while being allowed to move back and forth.

The handle 1 includes a T-shaped knob 1a and an L-shaped crank arm 1b that the knob 1a is rotatably attached to the tip thereof.

As illustrated in FIGS. 1 and 2, the reel unit 2 includes a reel body 2a and a fishing rod attachment leg 2b. The reel body 2a includes an opening in the lateral portion thereof. The fishing rod attachment leg 2b having a T shape is integrally formed with the reel body 2a while being forwardly extended from the reel body 2a in an obliquely upward direction. As illustrated in FIG. 2, the reel body 2a has a space in its inside for attaching a mechanism thereto. The space contains a rotor drive mechanism 5 and an oscillation mechanism 6. The rotor drive mechanism 5 is configured to rotate the rotor 3 in conjunction with rotation of the handle 1. The oscillation mechanism 6 is configured to move the spool 4 back and forth for uniformly winding the fishing line around the spool 4.

As illustrated in FIGS. 1 and 2, the spool 4 is disposed between first and second rotor arms 31, 32 of the rotor 3 to be described. The center portion of the spool 4 is coupled to the axial end of a spool shaft 15 through a drag mechanism 60 (see FIG. 2).

As illustrated in FIG. 2, the rotor drive mechanism 5 includes a handle shaft 10, a master gear 11, and a pinion gear 12. The handle shaft 10 allows the handle 1 to be fixedly attached thereto. The master gear 11 is configured to rotate together with the handle shaft 10. The pinion gear 12 meshes with the master gear 11. The both axial ends of the handle shaft 10 are rotatably supported by the reel unit 2 through bearings, respectively. The handle shaft 10 has female threaded portions on the both axial ends thereof. The threaded directions and the diameters of the female threaded portions are different from each other. The handle 1 is allowed to be fixedly attached to either of the female threaded portions.

The pinion gear 12 has a tubular shape and the axial front portion thereof is fixed to the rotor 3 by a nut 33 while penetrating the center portion of the rotor 3. The axial intermediate and rear portions of the pinion gear 12 are rotatably supported by the reel unit 2 through bearings, respectively.

The oscillation mechanism 6 is configured to move the spool 4 back and forth. As illustrated in FIG. 2, the oscillation mechanism 6 includes a helical shaft 21, a slider 22 and an intermediate gear 23. The helical shaft 21 is disposed in parallel to and approximately right below the spool shaft 15. The slider 22 is configured to move back and forth along the helical shaft 21. The intermediate gear 23 is fixed to the axial end of the helical shaft 21. The slider 22 allows the axial rear end of the spool shaft 15 to be fixedly attached thereto. The intermediate gear 23 meshes with the pinion gear 12.

As illustrated in FIG. 2, the rotor 3 includes a cylindrical portion 30, the first and second rotor arms 31, 32 and a bail arm 34. The cylindrical portion 30 is fixed to the pinion gear 12. The first and second rotor arms 31, 32 are disposed lateral to the cylindrical portion 30 while being opposed to each other. The bail arm 34 functions as a fishing line guide mechanism for guiding the fishing line onto the spool 4. The cylindrical portion 30, the first rotor arm 31 and the second rotor arm 32 are integrally formed and made of, for instance, aluminum alloy. As described above, the center of the axial front portion of the cylindrical portion 30 is fixedly attached to the axial front portion of the pinion gear 12 by the nut 33.

The bail arm 34 is attached to the tip of the first rotor arm 31 and the tip of the second rotor arm 32 while being allowed to pivot between a fishing line guide position and a fishing line release position. The bail arm 34 includes a first bail support member 40 and a second bail support member 42. The first bail support member 40 is pivotably attached to the tip of the first rotor arm 31, whereas the second bail support member 42 is pivotably attached to the tip of the second rotor arm 32. The first bail support member 40 is pivotably attached to the outer radial portion of the first rotor arm 31, whereas the second bail support member 42 is pivotably attached to the inner radial portion of the second rotor arm 32. As illustrated in FIGS. 3 to 7, the bail arm 34 further includes a bail 41, a fixation shaft 43 (see FIGS. 5 to 7), a line roller 44 and a fixation shaft cover 46. The bail 41 connects the first bail support member 40 and the second bail support member 42. The fixation shaft 43 is fixed to the first bail support member 40 with the axial end thereof. The line roller 44 is supported by the fixation shaft 43. The fixation shaft cover 46 covers the fixation shaft 43.

As illustrated in FIGS. 4 to 7, the first bail support member 40 includes an aim portion 40a and an attachment portion 40b. The arm portion 40a is pivotably attached to the first rotor arm 31. The attachment portion 40b is a ring-shaped portion integrally formed with the tip of the arm portion 40a. The attachment portion 40b includes a stepped through hole 40c (see FIGS. 5 to 7). A fixation bolt 52 penetrates the through hole 40c for fixing the fixation shaft 43 to the first bail support member 40.

Figure 3:
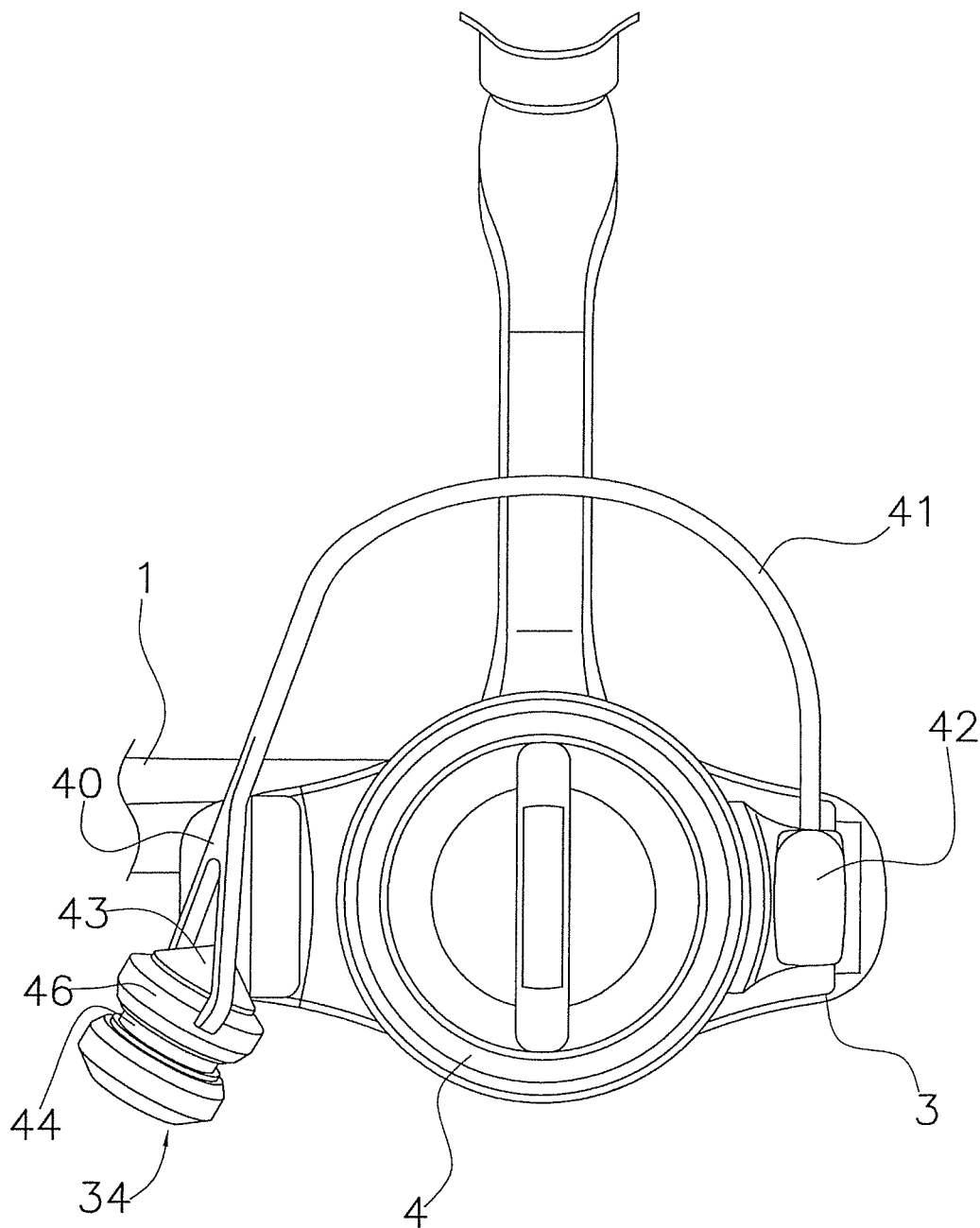
FIG. 3 is a front view of the spinning reel.
Figure 4:
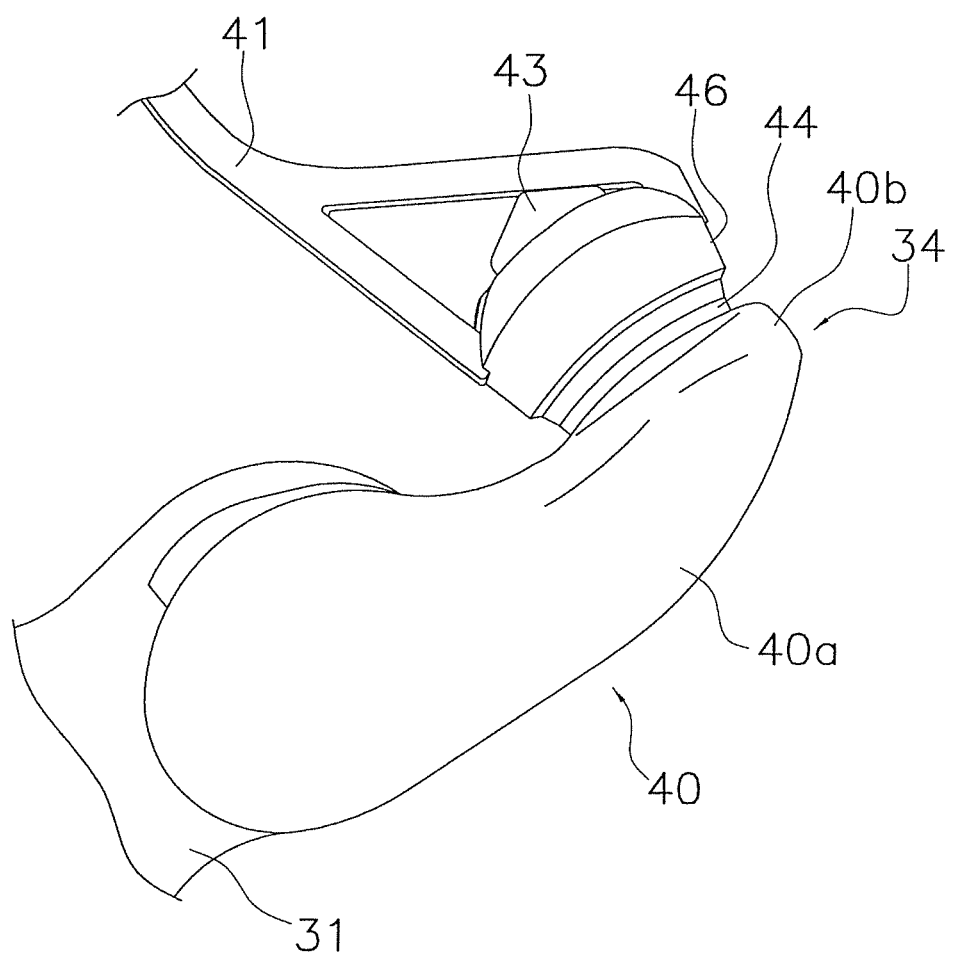
FIG. 4 is a perspective view of a bail arm laterally seen.

As illustrated in FIG. 3, the bail 41 is a rod-shaped member made of stainless alloy and the both ends thereof are respectively fixed to the second bail support member 42 and the fixation shaft cover 46. The bail 41 is arranged to be convexly and outwardly curved in a radial direction of the spool 4. The bail 41 is configured to lead the fishing line to the line roller 44 through the fixation shaft cover 46 when the bail arm 34 is returned to the fishing line guide position from the fishing line release position.

Figure 5:
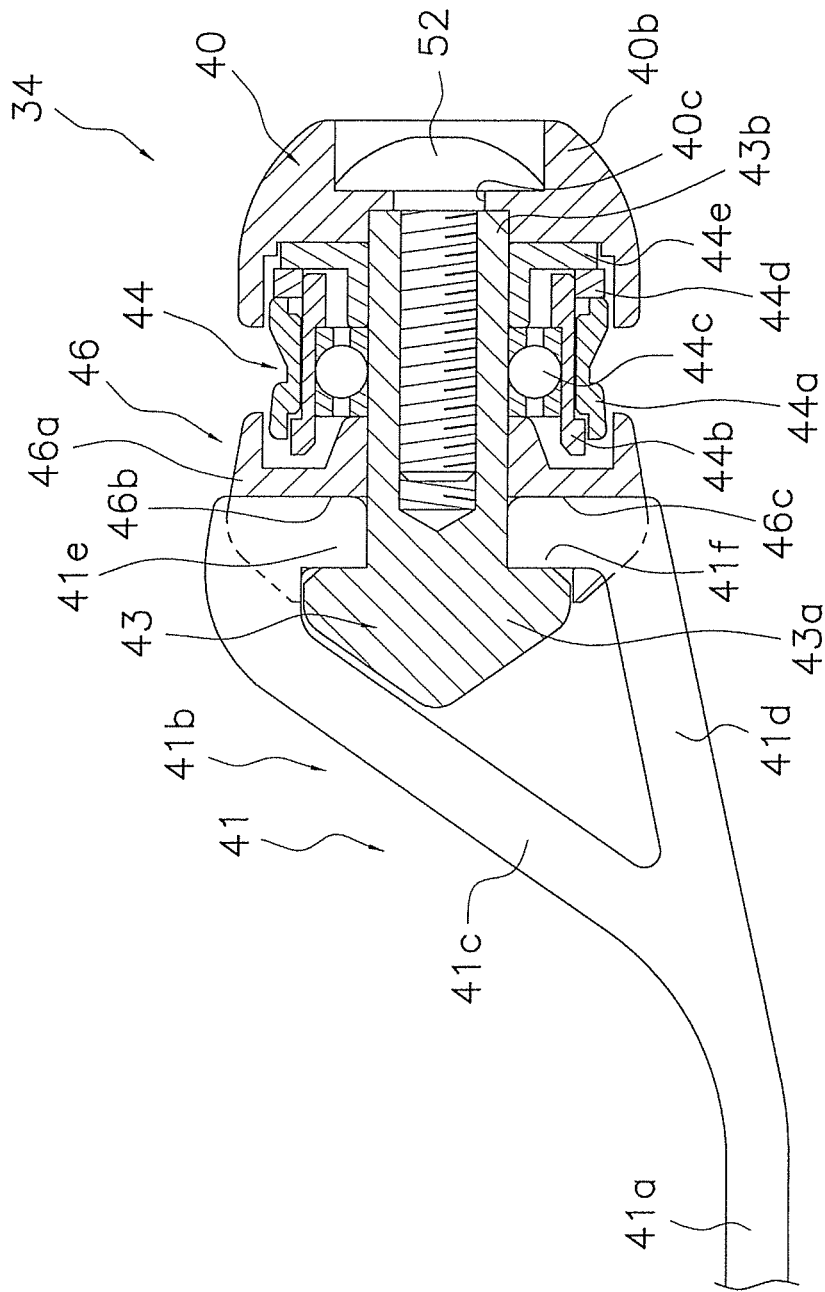
FIG. 5 is a cross-sectional side view of the bail arm.
Figure 6:
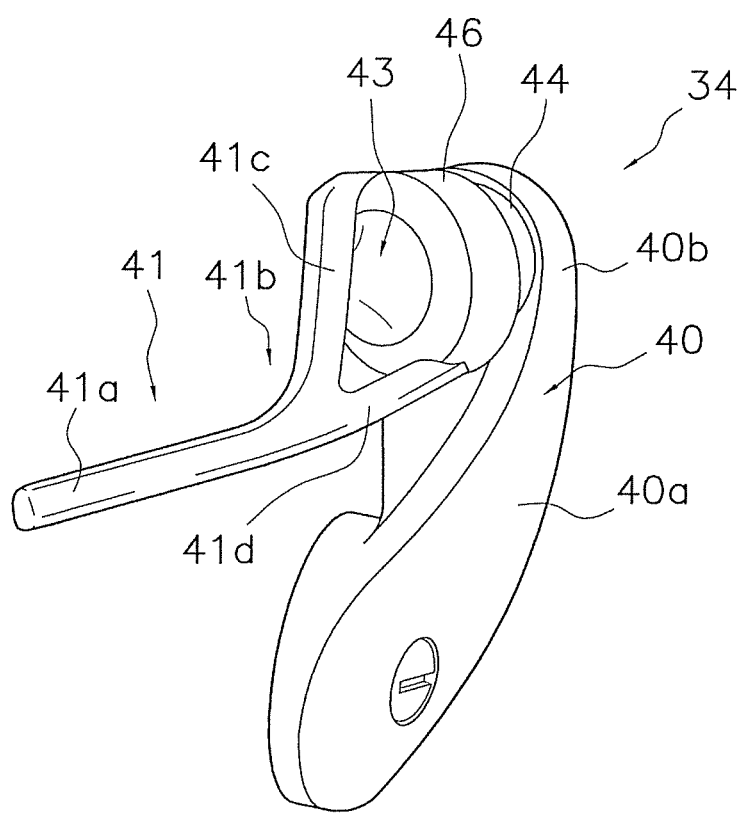
FIG. 6 is a perspective view of the bail arm seen from the front.
Figure 7:
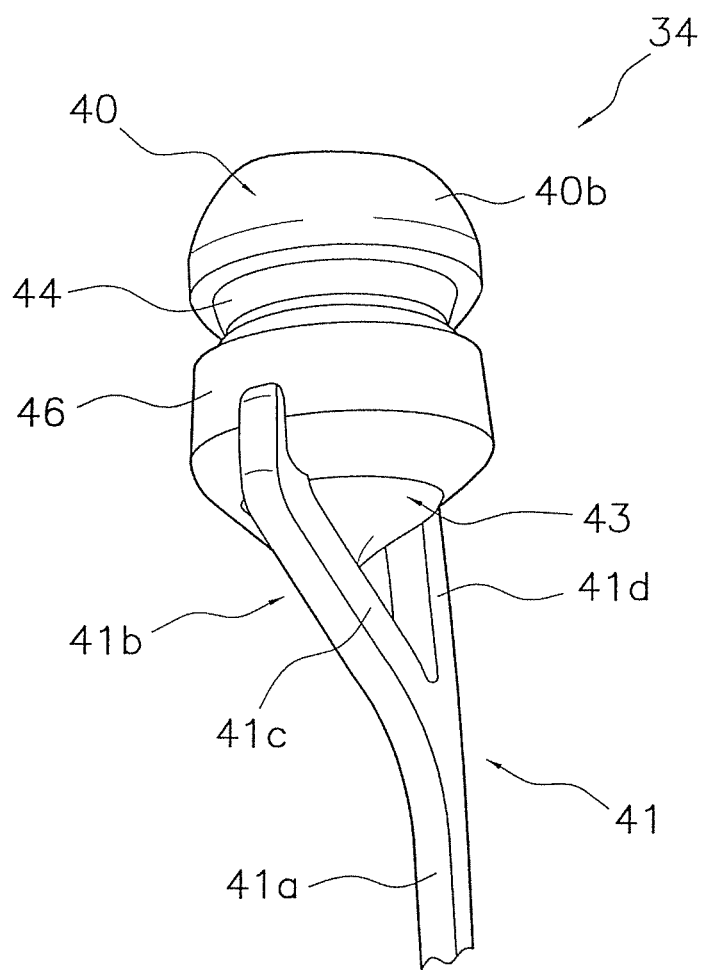
FIG. 7 is a perspective view of the bail arm seen from the above.

As illustrated in FIGS. 5 to 7, the bail 41 includes a rod portion 41a and a plate portion 41b. The rod portion 41a has a rod shape. The plate portion 41b is connected to the rod portion 41a with one end thereof, while being attached to the fixation shaft cover 46 with the other end thereof. As illustrated in FIGS. 5 to 7, one end of the plate portion 41b is smoothly connected to the fishing line guide side portion of the fixation shaft cover 46 and the opposite portion thereto, whereas the other end of the plate portion 41b is smoothly connected to the rod portion 41a. The rod portion 41a is a solid columnar member. The rod portion 41a and the plate portion 41b which form the bail 41 are integrally formed by stamping the entire outline of the rod portion 41a and the plate portion 41b out of a plate-shaped base material, and further processing the rod portion 41a is by machining or forging. Subsequently polishing it is by barreling. As a result, the fishing line is prevented from being get stuck in with the connected section between the outer surface of the rod portion 41a and the outer surface of either of the first and second plate sections 41c, 41d because the continued section is smoothly formed.

As illustrated in FIGS. 5 to 7, the plate portion 41b is branched to a first plate section 41c and a second plate section 41d. The first and second plate sections 41c, 41d extend in two directions from one end to the other ends thereof (i.e., from the rod portion 41a to the fixation shaft cover 46). The first and second plate sections 41c, 41d form an outline having a substantially triangular cross-section. The substantially triangular cross-section has a width expanded from one end (i.e., the rod-portion side end) to the other end thereof (i.e., the fixation-shaft-cover side end). Therefore, it is thereby possible to smoothly continue the outline of an area ranging from the rod portion 41a of the bail 41 to the cover body 46a of the fixation shaft cover 46.

Further, a space having a substantially triangular cross-section is formed between the first plate section 41c and the second plate section 41d. In other words, the entire bail 41 can be lightweight.

As illustrated in FIG. 5, the first plate section 41c includes a first engagement section 41e on the extended end thereof (i.e., the fixation-shaft-cover side end), whereas the second plate section 41d includes a second engagement section 41f on the extended end thereof (i.e., the fixation-shaft-cover side end). Therefore, tangling of the fishing line can be further reliably prevented due to the structure in which the engagement sections 41e, 41f are inserted into the engagement grooves 46b, 46f and are disposed on the lateral portion of the fixation shaft cover 46. The well-known structure in the art has a plate portion which is inserted into a groove portion and is disposed on an axial end of the fixation shaft cover.

The first engagement section 41e has a bent shape for engaging at a substantially right angle with a first engagement groove 46b of the fixation shaft cover 46 to be described. Similarly, the second engagement section 41f has a bent shape for engaging at a substantially right angle with a second engagement groove 46c of the fixation shaft cover 46 to be described. Therefore, tangling of the fishing line is prevented, and simultaneously the engagement sections 41e, 41f are prevented from being easily detached from the engagement grooves 46b, 46c due to the structure in which the engagement sections 41e, 41f are inserted into the engagement grooves 46b, 46c and are disposed on the outer peripheral surface of the lateral portion of the fixation shaft cover 46. Further, the bail 41 can be rigidly fixed to the fixation shaft cover.

The outer radial surface of the first plate section 41c is slanted for smoothly continuing to the outer surface of the rod portion 41a. The outer radial surface of the second plate section 41d is slightly slanted for smoothly continuing to the outer surface of the rod portion 41a.

As illustrated in FIGS. 5 to 7, the fixation shaft 43 is a shaft member made of aluminum alloy to be attached to the fixation shaft cover 46 from a bail side end of the fixation shaft cover 46 as an individual separate member. The fixation shaft 43 includes a head portion 43a having a large diameter and a shaft portion 43b that the line roller 44 is disposed about the outer periphery thereof. As illustrated in FIG. 5, the head portion 43a is a substantially cone-shaped protruded portion having the bail side end thereof as the apex of the cone shape. The head portion 43a is disposed within the space with a substantially triangular cross-section produced between the first and second plate sections 41c, 41d of the bail 41. A part of the cone-shaped outer peripheral surface of the head portion 43a facing to the first plate section 41c is substantially parallel to the inner radial surface of the first plate section 41c. The head portion 43a is thereby prevented from hindering positioning of the first plate section 41c. The shaft portion 43b is extended from the bottom of the cone-shaped head portion 43a towards the first bail support member 40. The extended end of the shaft portion 43b is fixed to the first bail support member 40 by the fixation bolt 52 screwed into the shaft portion 43b.

As illustrated in FIG. 5, the line roller 44 includes a guide portion 44a, a tubular portion 44b and a bearing 44c. The guide portion 44a is a tubular portion having a groove on the outer peripheral surface thereof for guiding the fishing line. The tubular portion 44b is disposed on the inner peripheral side of the guide portion 44a. The bearing 44c is a roller bearing disposed on the inner peripheral side of the tubular portion 44b. The guide portion 44a is rotatably supported by the shaft portion 43b of the fixation shaft 43 through the tubular portion 44b and the bearing 44c. Further, an axial end of the guide portion 44a is disposed on the inner peripheral side of a tubular section of the attachment portion 40b of the first bail support member 40, as illustrated in FIG. 5. An annular member 44d is attached to the clearance produced between the axial end (i.e., the first-bail-support member side end) of the guide portion 44a and the inner periphery of the tubular section of the attachment portion 40b. The structure prevents the fishing line from easily entering the inside of the first bail support member 40. Further, an axial end of the annular member 44d is appropriately positioned by a tubular interposed member 44e attached onto the extended end of the shaft portion 43b of the fixation shaft 43. An axial end of the interposed member 44e is abutted to the bottom of the tubular section of the attachment portion 40b of the first bail support member 40, whereas the other axial end of the interposed member 44e is abutted to an axial end of an inner race of the bearing 44c. The bearing 44c is thus appropriately positioned while being interposed between the interposed member 44e and the fixation shaft cover 46.

As illustrated in FIGS. 5 to 7, the fixation shaft cover 46 is disposed onto the bail side end of the fixation shaft 43 while being separate away from the attachment portion 40b of the first bail support member 40. As illustrated in FIG. 5, the fixation shaft cover 46 is a substantially cylindrical member made of synthetic resin and includes a substantially cylindrical cover body 46a, the first engagement groove 46b and the second engagement groove 46c. The cover body 46a is disposed onto the bail side end of the fixation shaft 43 while being separate away from the first bail support member 40. The first and second engagement grooves 46b, 46c are opened on the outer peripheral surface of the lateral portion of the cover body 46a at two positions. The first engagement section 41e of the bail 41 is engaged with the first engagement groove 46b, whereas the second engagement section 41f of the bail 41 is engaged with the second engagement groove 46c. As illustrated in FIG. 5, the first and second engagement grooves 46b, 46c are opened on the lateral portion of the cover body 46a while being disposed opposite to each other through the fixation shaft 43. The first and second engagement grooves 46b, 46c are respectively recessed perpendicularly to the fixation shaft 43 for allowing the first and second engagement sections 41e, 41f of the plate portion 41b to be engaged therewith at substantially right angles. The center portions (i.e., radial recessed ends) of the first and second engagement grooves 46b, 46c are positioned about the identical axis. In other words, the first and second engagement grooves 46b, 46c are recessed on the cover body 46a while being symmetric to each other with respect to the axis of the fixation shaft 43. Further, the first engagement groove 46b has a substantially rectangular outline identical to the outline of the first engagement section 41e of the plate portion 41b. Similarly, the second engagement groove 46c has a substantially rectangular outline identical to the outline of the second engagement section 41f of the plate portion 41b. The first and second engagement sections 41e, 41f of the plate portion 41b are herein respectively inserted and fixed into the first and second engagement grooves 46b, 46c opened on the lateral portion of the cover body 46a of the fixation shaft cover 46.

The engagement grooves 46b, 46c can be easily formed on the outer peripheral surface of the cylindrical cover body 46a. Further, the engagement grooves 46b, 46c can be reliably opened on the lateral portion of the cover body 46a along the outer peripheral direction. Tangling of the fishing line can be thereby further reliably prevented.

Next, operations and actions of the reel will be hereinafter explained in detail.

In casting the fishing line, the rotor 3 is set in the anti-rotation state, and the bail arm 34 is flipped to the fishing line release position while being held by the angler's hand. The fishing line is allowed to be easily reeled out of the spool 4 under the condition that the bail arm 34 is rotated down to the fishing line release position.

The rotor drive mechanism 5 causes the rotor 3 to rotate in a fishing line winding direction when the handle 1 is rotated in the fishing line winding direction under the condition that the bail arm 34 is kept set in the fishing line release position after casting. When the rotor 3 is rotated in the fishing line winding direction, the bail arm 34 is returned to the fishing line winding position. When the handle 1 is herein further rotated in the fishing line winding direction, the fishing line is lead from the bail 41 to the line roller 44 through the fixation shaft cover 46 and is wound around the spool 4.

According to the spinning reel of the present exemplary embodiment, the fixation shaft cover 46 includes the first and second engagement grooves 46b, 46c opened on the lateral portion of the cover body 46a. Further, the bail 41 includes the plate portion 41b made up of the first and second engagement sections 41e, 41f to be respectively engaged with the first and second engagement grooves 46b, 46c. According to the bail 41, the first and second engagement sections 41e, 41f of the plate portion 41b are respectively inserted into the first and second engagement grooves 46b, 46c opened on the lateral portion of the cover body 46a of the fixation shaft cover 46. The first and second engagement sections 41e, 41f of the plate portion 41b, respectively inserted into the first and second engagement grooves 46b, 46c, are disposed on the lateral portion of the fixation shaft cover 46. Therefore, the structure prevents the fishing line from tangling therewith compared to the well-known structure that the plate portion 41b, inserted into a groove portion, is disposed on the axial end of the fixation shaft cover 46.

Other Exemplary Embodiments (a) The front drag spinning reel has been exemplified for explaining the aforementioned exemplary embodiment. However, the present invention is not limited to the front drag spinning reel and is applicable to any suitable spinning reels including the rear drag spinning reels, the spinning reels without drag control, and the lever drag spinning reels.

(b) In the aforementioned exemplary embodiment, the fixation shaft 43 and the fixation shaft cover 46 are formed as individual separate components. However, the fixation shaft 43 and the fixation shaft cover 46 may be integrally formed.

(c) In the aforementioned exemplary embodiment, the rod portion 41a of the bail 41 is a solid columnar member. However, the rod portion 41a is not limited to the solid columnar member. For example, the rod portion 41a may be a hollow cylindrical member. In this case, the bail 41 can be lightweight.

(d) In the aforementioned exemplary embodiment, the cover body 46a of the fixation shaft cover 46 is substantially cylindrical. However, the cover body 46a is not limited to the cylindrical shape, as long as it includes the first and second engagement grooves 46b, 46c on the lateral portion thereof.

(e) In the aforementioned exemplary embodiment, the plate portion 41b of the bail 41 is branched into the first and second plate sections 41c, 41d which extend in two directions from one end to the other ends. However, the plate portion 41b is not limited to this shape.

(f) In the aforementioned exemplary embodiment, the head portion 43a is formed in a substantially cone shape having the bail side end of the fixation shaft 43 as the apex of the cone shape. However, the fixation shaft cover 46 may be formed in a substantially cone shape having the bail side end thereof as the apex of the cone shape when being disposed closer to the bail 41 than the fixation shaft 43 is.

(g) In the aforementioned exemplary embodiment, the rod portion 41a and the plate portion 41b of the bail 41 are integrally formed by stamping. However, the manufacturing method for the rod portion 41a and the plate portion 41b is not limited to the stamping. For example, the rod portion 41a and the plate portion 41b may be formed as individual separate components and may be joined to each other, for instance, by welding.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel fishing line guide mechanism for guiding a fishing line onto a spool, the spinning reel fishing line guide mechanism attached to a tip of a first rotor arm and a tip of a second rotor arm for pivoting , the spinning reel fishing line guide mechanism comprising:
a first bail support member being pivotably attached to the tip of the first rotor arm;
a second bail support member being pivotably attached to the tip of the second rotor arm;
a fixation shaft fixed to the first bail support member at a first axial end of the fixation shaft;
a fixation shaft cover including
a cover body disposed onto a second axial end of the fixation shaft, the cover body being separate from the first bail support member, the second axial end being opposite to the first axial end, the cover body having a lateral portion, and a first engagement groove on the lateral portion of the cover body, the first engagement groove being open to a surface of the lateral portion, the first engagement groove extending in a first direction intersecting the axis of the fixation shaft;

a line roller being rotatably supported by the fixation shaft, the line roller including a guide portion on a peripheral surface thereof for guiding the fishing line; and a bail configured to lead the fishing line to the line roller through the fixation shaft cover, the bail including a rod portion having a rod shape, and a plate portion attached to the rod portion at a first end of the plate portion, the plate portion extending to the lateral portion of the cover body, the plate portion including a first engagement section extending from a second end opposite to the first end, the first engagement section extending in the first direction and being engaged with the first engagement groove.

2. The spinning reel fishing line guide mechanism according to claim 1, wherein the cover body is substantially cylindrical, and the engagement groove is formed on an outer peripheral surface of the lateral portion of the cover body.

3. The spinning reel fishing line guide mechanism according to claim 1, wherein the fixation shaft cover including a second engagement groove, where the second engagement groove is disposed on the lateral portion and disposed opposite to the first engagement groove across the fixation shaft, and the bail includes a second engagement section, where the second engagement section is engaged with the second engagement groove.

4. The spinning reel fishing line guide mechanism according to claim 3, wherein the plate portion is branched and has a first plate section extending in a first direction and a second plate section extending in a second direction different from the first direction, and the first engagement section is configured on an end of the first plate section, the second engagement section is configured on an end of the second plate section.

5. The spinning reel fishing line guide mechanism according to claim 4, wherein either the fixation shaft or the fixation shaft cover includes a head portion being substantially cone-shaped, the head portion has an axial end thereof opposite to the first bail support member, where the axial end is disposed between the first plate section and the second plate section.

6. The spinning reel fishing line guide mechanism according to claim 4, wherein either the first plate section or the second plate section has an outer surface smoothly continued to an outer surface of the rod portion.

7. The spinning reel fishing line guide mechanism according to claim 1, wherein the plate portion has width from the first end to the second end.

8. The spinning reel fishing line guide mechanism according to claim 4, wherein the first and second engagement sections are bent for engaging with the first and second engagement grooves respectively, where each of the first and second engagement sections has a substantially right angle.

* * * * *